(12) United States Patent
Martínez Gimeno

(10) Patent No.: US 10,895,485 B2
(45) Date of Patent: Jan. 19, 2021

(54) CONTAINER WITH METERING CAP

(71) Applicants: Carlos Vicente Martínez Gimeno, Alicante (ES); Gabriel Salomón Martinez Garcia, Alicante España (ES); Manuel Francisco Martínez Chapuli, Alicante España (ES)

(72) Inventor: Carlos Vincente Martínez Gimeno, Alicante (ES)

( * ) Notice: Subject to any disclaimer, the term of this patent is extended or adjusted under 35 U.S.C. 154(b) by 0 days.

(21) Appl. No.: 16/338,459

(22) PCT Filed: Jun. 21, 2018

(86) PCT No.: PCT/ES2018/070441
§ 371 (c)(1),
(2) Date: Mar. 29, 2019

(87) PCT Pub. No.: WO2019/008202
PCT Pub. Date: Jan. 10, 2019

(65) Prior Publication Data
US 2020/0141780 A1    May 7, 2020

(30) Foreign Application Priority Data
Jul. 4, 2017  (ES) .................................. 201700653

(51) Int. Cl.
*G01F 11/26* (2006.01)
*B65D 1/02* (2006.01)
*B65D 47/12* (2006.01)

(52) U.S. Cl.
CPC .......... *G01F 11/266* (2013.01); *B65D 1/0223* (2013.01); *B65D 47/121* (2013.01); *B65D 2501/0081* (2013.01)

(58) Field of Classification Search
CPC ....... G01F 11/26; G01F 11/262; G01F 11/266
USPC .......................... 222/456, 454, 455, 109, 158
See application file for complete search history.

(56) References Cited

U.S. PATENT DOCUMENTS

| | | | | |
|---|---|---|---|---|
| 1,066,127 A | * | 7/1913 | Lewis | G01F 11/261 222/455 |
| 1,332,476 A | * | 3/1920 | Stough | A47G 19/34 222/455 |
| 1,373,534 A | * | 4/1921 | Smith, Jr. | F16N 3/04 222/454 |
| 1,373,535 A | * | 4/1921 | Smith, Jr. | F16N 3/04 222/456 |
| 1,949,130 A | * | 2/1934 | Renfro | G01F 11/263 222/454 |
| 1,957,326 A | * | 5/1934 | Day | G01F 11/262 222/455 |

(Continued)

*Primary Examiner* — Paul R Durand
*Assistant Examiner* — Randall A Gruby
(74) *Attorney, Agent, or Firm* — Noli IP Solutions

(57) ABSTRACT

A container (6) and a metering cap (3) are designed to be fitted together and include a cap (3) defined as a concave component with a curved top and a sloping cylindrical neck on the side thereof, with a mouth (1) that can be closed by a stopper (T), the lower distal end (1a) of the neck extending into the concave cavity defined by the cap (3), wherein this extension does not project beyond the bottom plane defined by the lower peripheral edge (9) of the cap (3); and wherein the container (6) comprises a hemispherical protrusion (2) which corresponds to a cavity (Oi) located on one side of the top of the container (6).

3 Claims, 10 Drawing Sheets

(56) References Cited

U.S. PATENT DOCUMENTS

| | | | | |
|---|---|---|---|---|
| 2,091,929 A * | 8/1937 | Kappenberg | G01F 11/262 | 222/455 |
| 2,204,104 A * | 6/1940 | Masters | G01F 11/262 | 222/456 |
| 2,370,820 A * | 3/1945 | Stott | G01F 11/262 | 222/456 |
| 2,385,195 A * | 9/1945 | Clower | G01F 11/26 | 222/456 |
| 2,507,362 A * | 5/1950 | Wilhelm | G01F 11/262 | 222/424.5 |
| 2,511,493 A * | 6/1950 | Cerruti | B43L 25/02 | 222/584 |
| 2,601,040 A * | 6/1952 | Livingstone | B65D 47/40 | 222/109 |
| 2,619,263 A * | 11/1952 | Duggan | G01F 11/266 | 222/454 |
| 2,782,966 A * | 2/1957 | Wiedenmeier | A47G 19/34 | 222/455 |
| 3,254,809 A * | 6/1966 | Breneman | A61J 7/0046 | 222/442 |
| 3,590,416 A * | 7/1971 | Henningsen | B44D 3/12 | 15/257.06 |
| 4,079,859 A * | 3/1978 | Jennings | G01F 11/262 | 116/DIG. 47 |
| 4,183,450 A * | 1/1980 | Downing | G01F 11/262 | 222/455 |
| 4,243,162 A * | 1/1981 | Klygis | B65D 25/465 | 215/383 |
| 4,613,064 A * | 9/1986 | Meyer | B65D 83/06 | 222/456 |
| 4,666,065 A * | 5/1987 | Ohren | G01F 11/262 | 222/109 |
| 4,696,416 A * | 9/1987 | Muckenfuhs | B65D 41/26 | 222/109 |
| 4,893,732 A * | 1/1990 | Jennings | G01F 11/262 | 222/109 |
| 5,029,736 A * | 7/1991 | Maruyama | G01F 11/26 | 222/455 |
| 5,054,660 A * | 10/1991 | Sherman | G01F 11/262 | 222/454 |
| 5,467,903 A * | 11/1995 | Sorensen | G01F 11/261 | 222/455 |
| 6,758,375 B2 * | 7/2004 | Ho | B65D 23/00 | 222/454 |
| 7,673,774 B2 * | 3/2010 | Molloy | B65D 47/40 | 222/109 |
| 8,925,768 B1 * | 1/2015 | Ismail | G01F 11/261 | 222/434 |
| 10,351,319 B1 * | 7/2019 | Mizer | B65D 47/40 | |
| 10,583,980 B2 * | 3/2020 | French | A61J 1/03 | |
| 2010/0327018 A1 * | 12/2010 | Hofte | B65D 25/48 | 222/145.5 |
| 2012/0248153 A1 * | 10/2012 | Peng | G01F 11/262 | 222/454 |

* cited by examiner

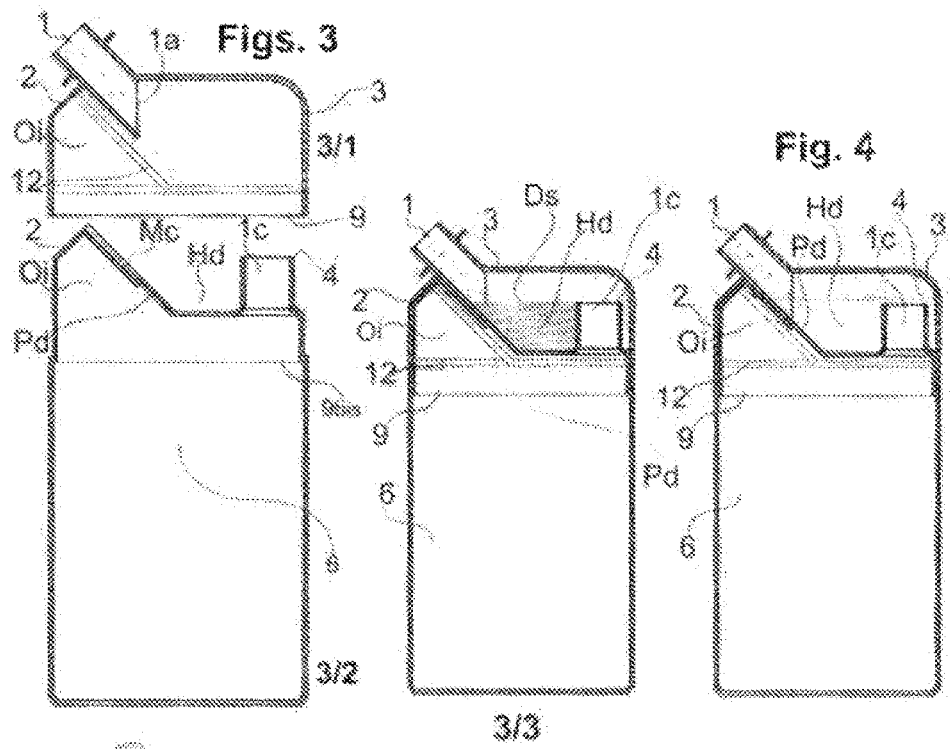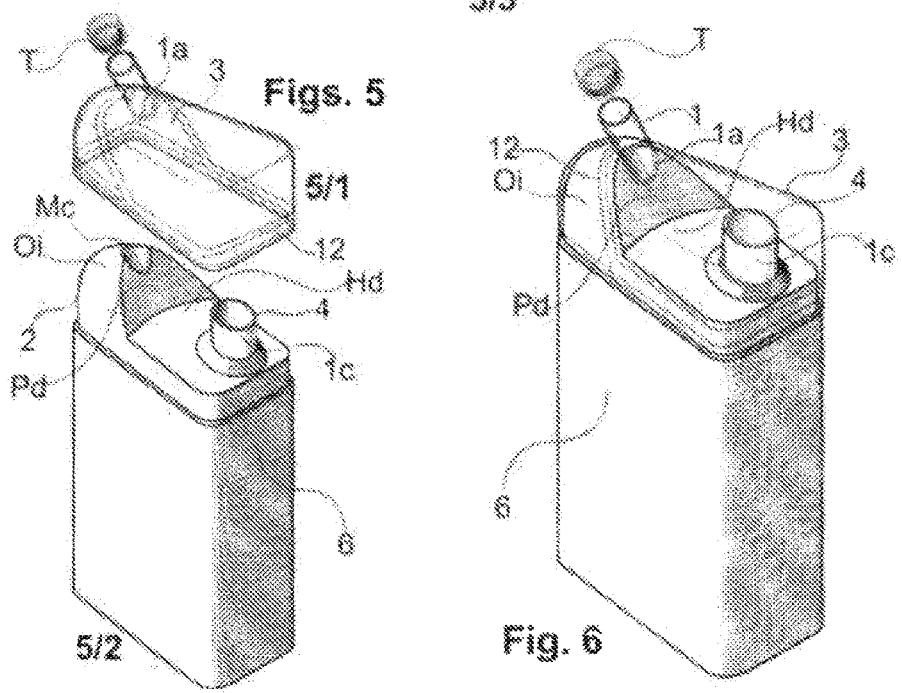

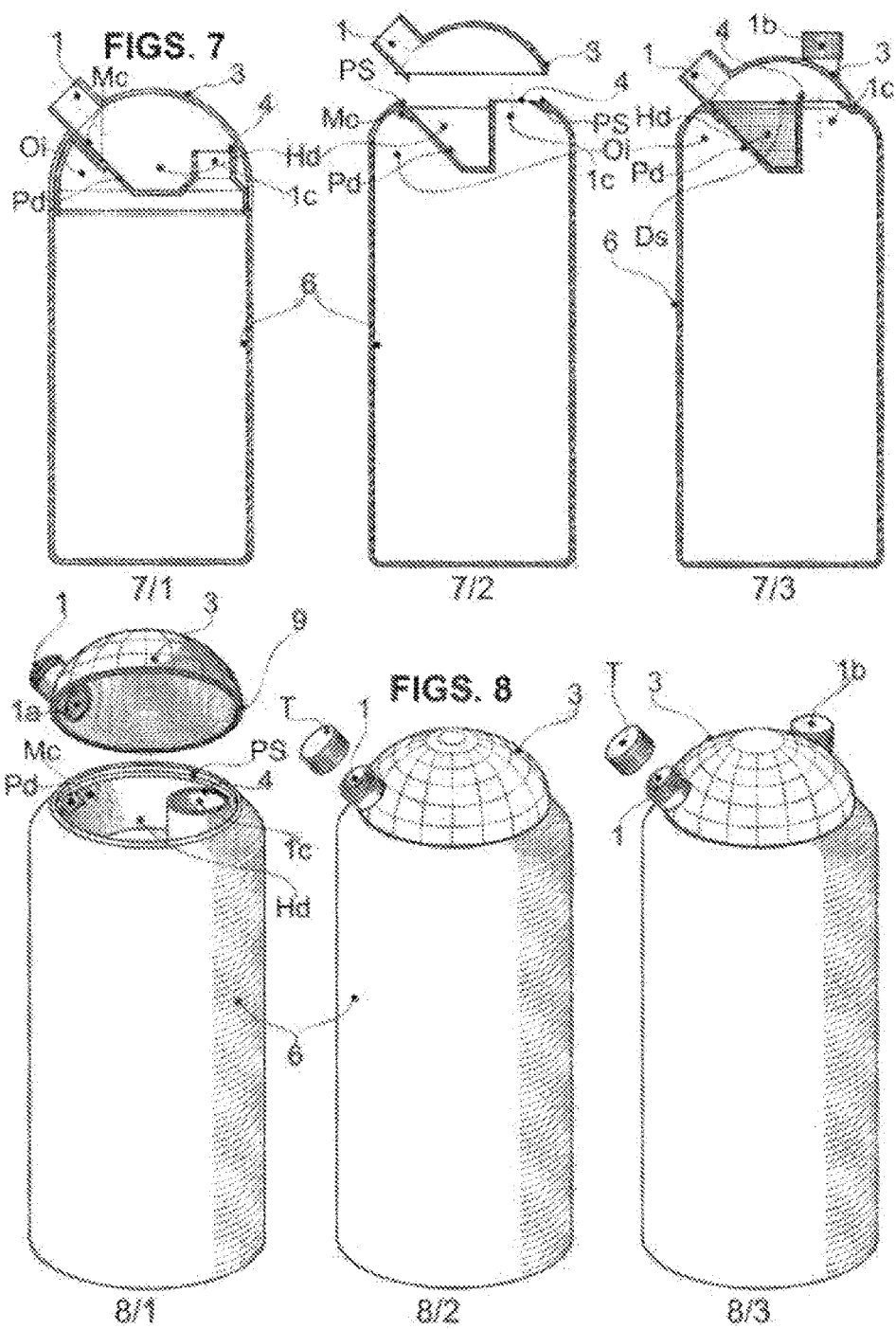

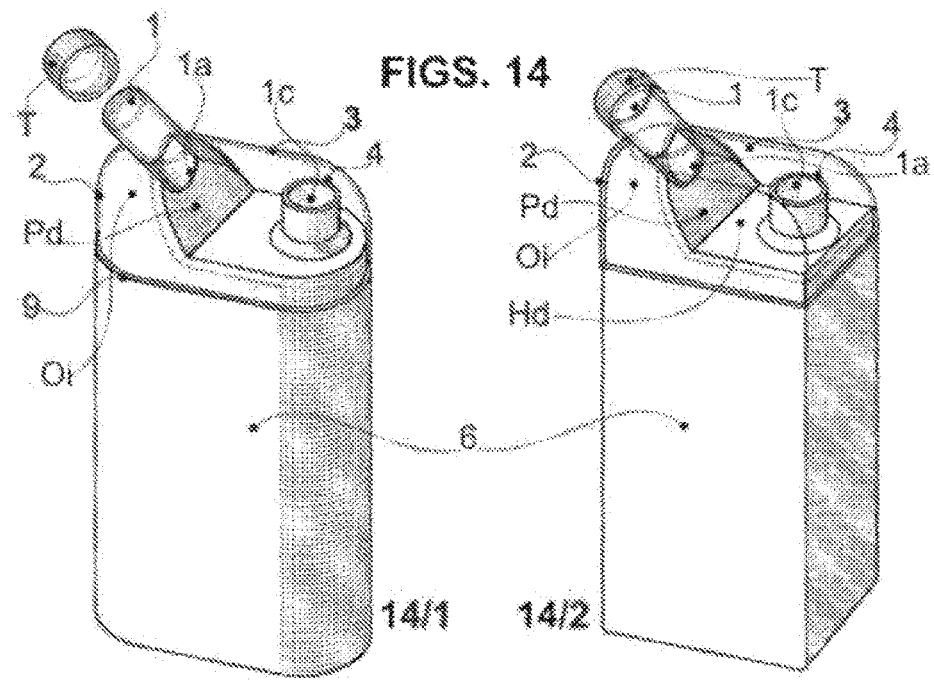
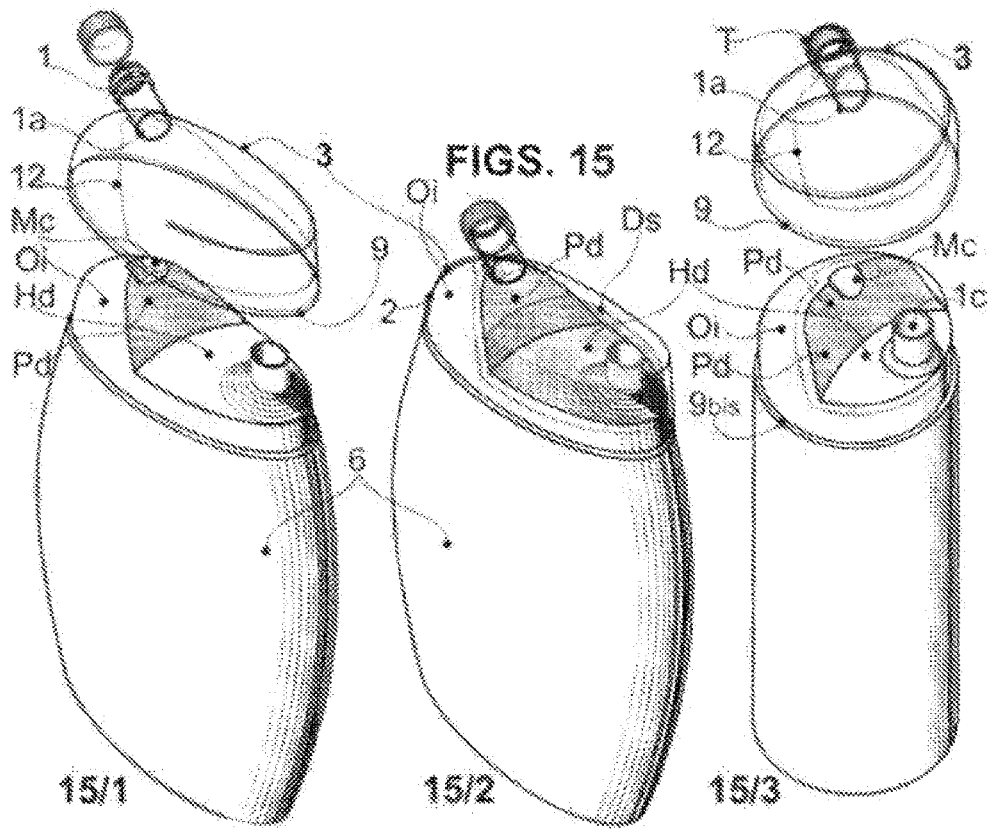

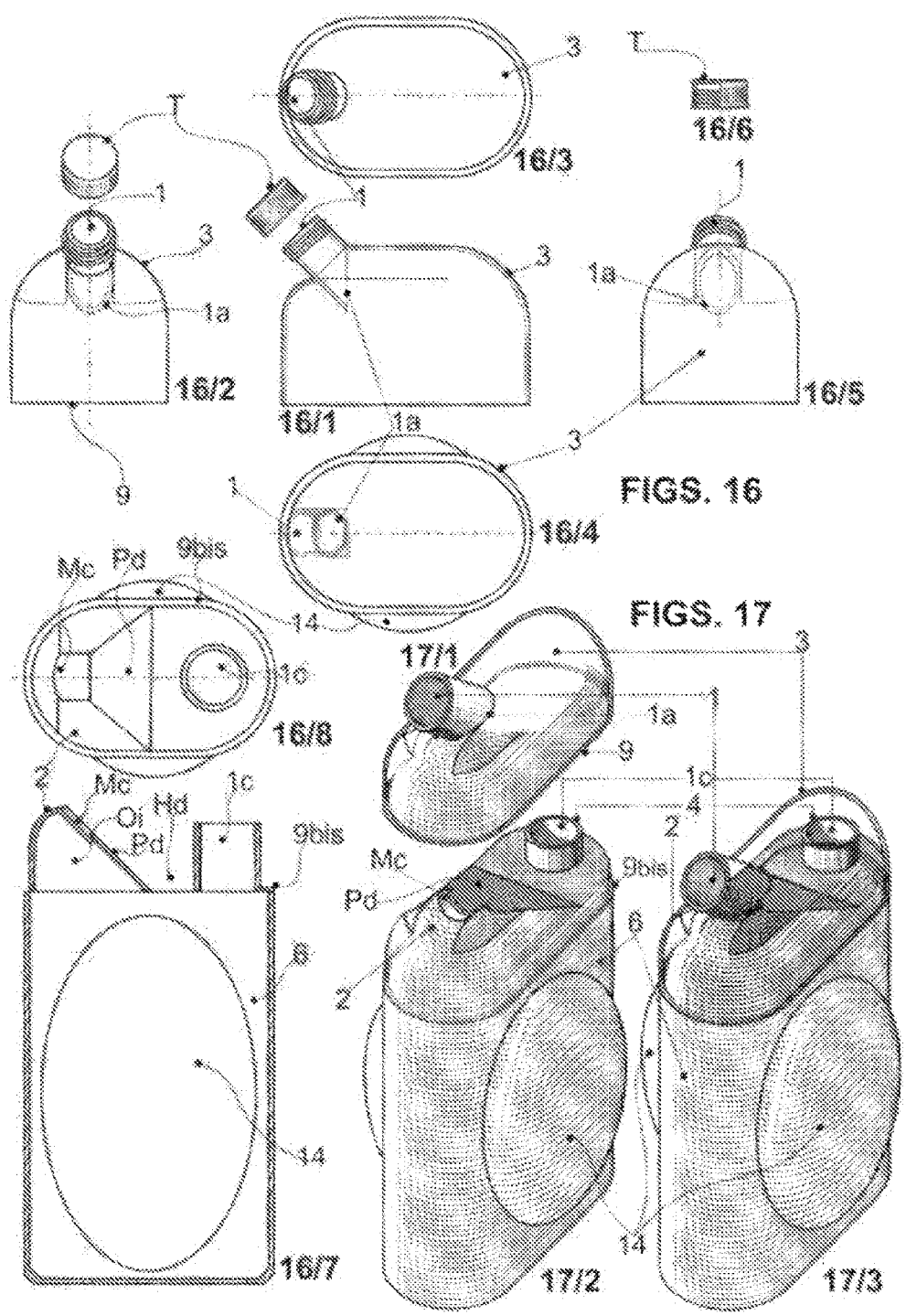

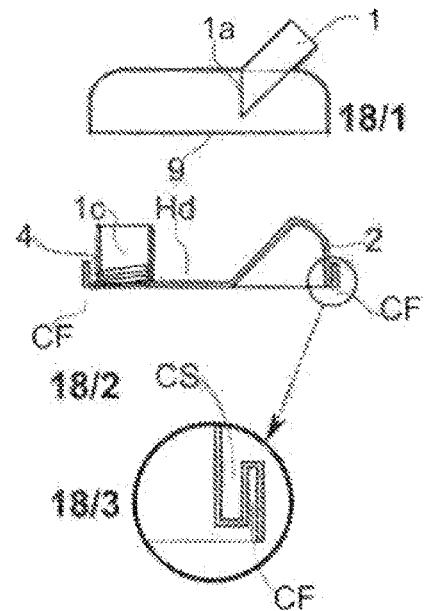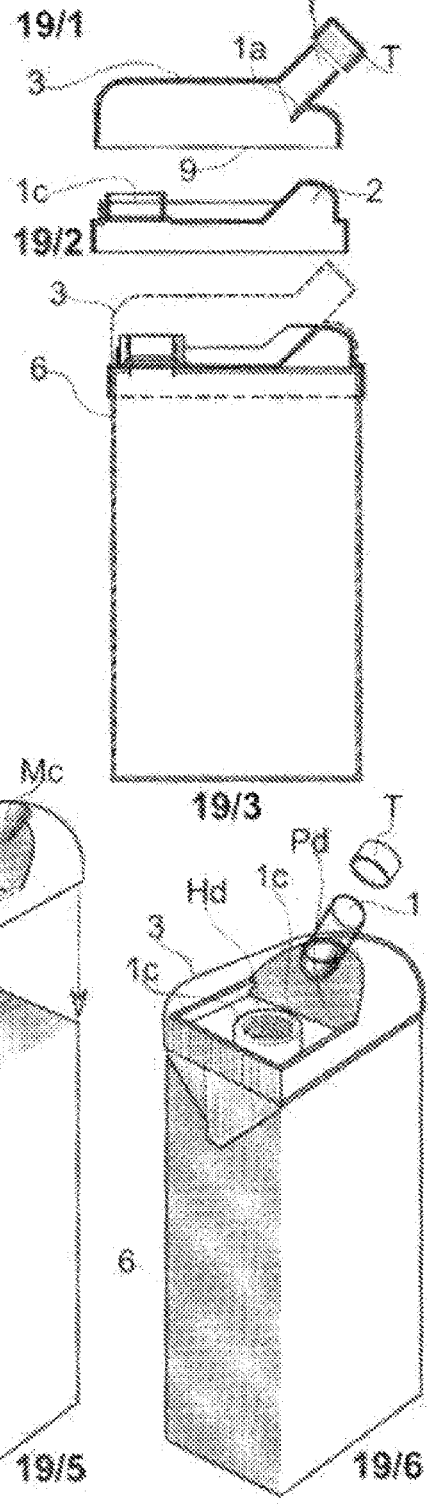

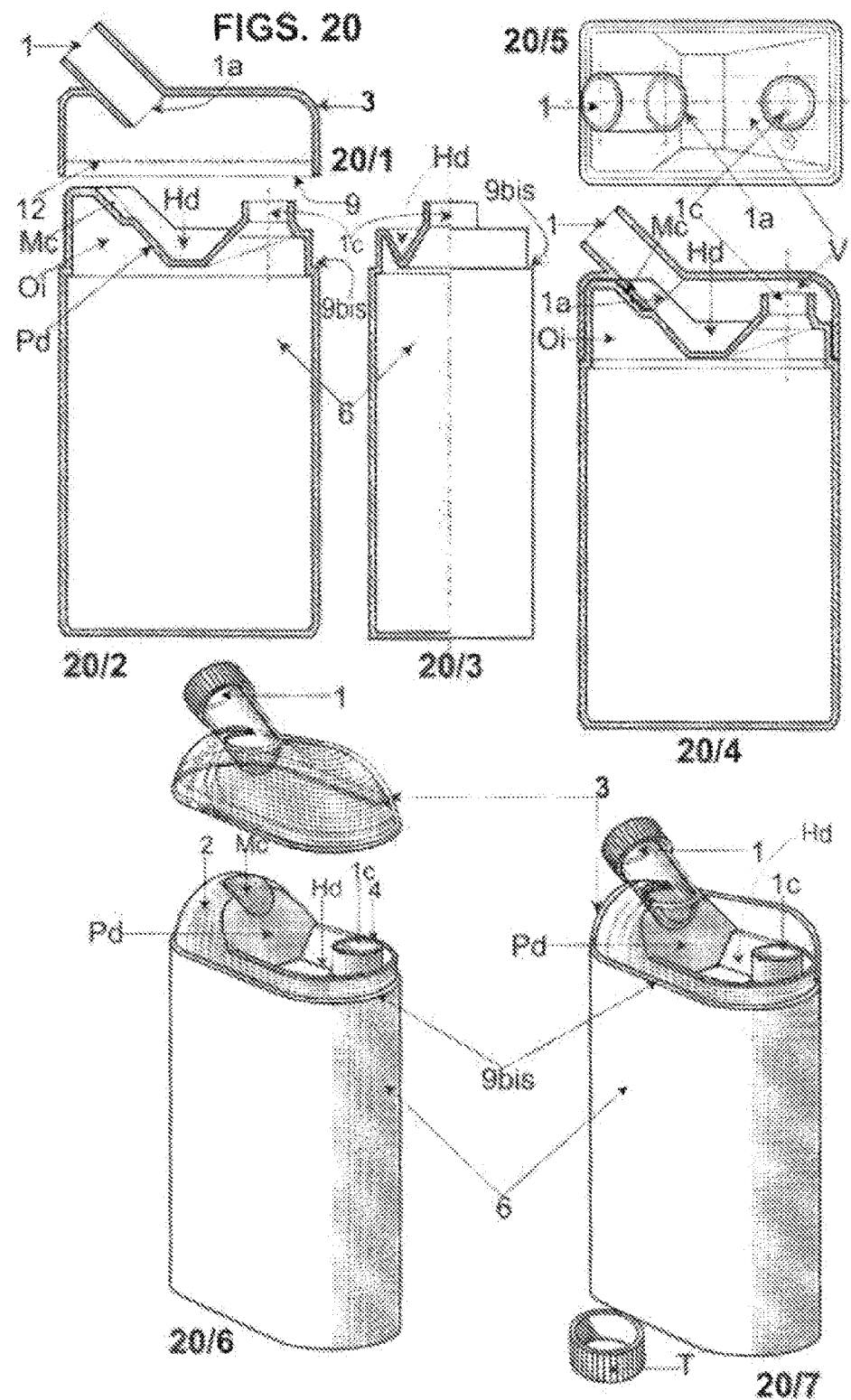

CONTAINER WITH METERING CAP

The object of this invention refers to an air-tight container equipped with a vertical tube with mouth adjacent to an irregular semi-cylindrical bulge to which a dispenser cap is associated that is configured as a domed and hollow structure containing a neck on an upper side of its crest with screwed and plugged mouth, whereas its lower cavity fits in the upper zone of the actual container—previously filled with a liquid which we want to measure—forming with this join an air-tight, floodable and independent chamber which selects and retains a uniform measure of liquid that is served directly when needed.

SECTOR OF THE ART

This invention refers to a dispensing cap for packs containing liquid. It consequently belongs to the technical sector of packs and bottles used as containers of liquids and which, in turn, permit these liquids to be measured and served.

PRIOR STATE OF THE ART

In the present state of the art, pouring liquids from a bottle or pack, either to drink from the bottle or pack directly or to serve part of their contents in a glass or other container, is usually done without any kind of prior measuring. It is therefore impossible to serve the same amount of liquid continuously in each pour, because the bottles and packs that are in use at the moment are strictly recipients to contain liquids that lack efficient measuring means and are not integrated in their structure.

In the sectors of dietetics, pharmacy, hotel and catering, manufacturers of alcoholic drinks, soft drinks or in the chemical and pharmaceutical industries, bottles are needed that are not complicated to handle, that do not have big production costs and which in turn allow the amount of liquid to be precisely controlled that is poured each time the bottle is tilted to serve the liquid content. This function is an old demand by users that is not covered.

Until now, to know the amount of fluid that is extracted from a bottle, independent containers are used of recognised capacity or with graphics that indicate the content, generally in fractions of litre, such as test pieces or packs with graphic scales or, in a more cumbersome and awkward way, with dosing caps.

The state of the art that is resolved in this invention therefore lies in the need to put a measuring system within reach of consumers that is integrated in the packs and bottles, that is easy to use and highly reliable, with dosing properties that do not involve an unaffordable increase in their manufacturing cost and whose look, size and characteristics do not make them difficult to manufacture or delay the automatic filling process on a production line.

In the present state of the art, patents of bottles and dispensing packs have been known since 1896 until now, which were not manufactured because they were naive attempts that did not contemplate or solve important mass production problems, one of which was filling on line, because to have a smaller chamber between the outlet and main deposit impedes a fluid entry of liquids or makes an industrial filling impossible. That is why, today, to measure fluids, the same enlarged caps of the containers are used and their capacity determines the measure. Examples of patents of this type are papers U.S. Pat. Nos. 595,176, 2,204,104, 4,079,859, 4,646,948, 4,860,927, 4,893,732, WO03/089319, NL1035069, WO2014/012212, JP62821 and EP0436260 A1.

Paper EP0436260 A1, describes a self-dosing container that presents an upper measuring chamber with an entry supply spout and an outlet spout. The entry delivery spout is shaped so that a lower part of the wall of this spout lies in or under the lowest point of the outlet spout and the highest point of this spout lies in or above the highest point of the outlet spout. This characteristic causes an insecure and negligent action when pouring because the first measures are altered when the liquid from inside the pack arrives in the tilting process, an irregularity that disqualifies that dosing proposal. In addition, this paper, EP0436260 A1 lacks a fundamental operational characteristic which is contained in the present invention: A bulge strategically placed at the top of the pack; this bulge and its cavity are decisive to ensure calibrated measures—from the first to the last service. —The absence of this element in the patent of reference was the reason for its failure. The present invention is therefore differentiated from any other, not only by the unprecedented and genuine bulge at the top of its pack, but for the proactive functions derived from the strategic position of that bulge which provides safe and uniform measures from the very first service.

The papers in question were not implemented because of the excessive production costs and technical difficulties. A container is therefore needed for liquids that can be measured and that has a dispensing system that simplifies the present procedure for obtaining a measure, particularly the ones that are used to hold household cleaning products, because the bottlers need this and users have been asking for it for many years now.

EXPLANATION OF THE INVENTION

The object of this invention is to provide an economic measuring system in packs for liquids which are designed to contain a vertical side tube and adjacent to this there is a bulge that increases its space, on which, after being filled, a cap or hood is fitted at the top. This coalition produces an independent air-tight chamber between both parts with upper diagonal outlet that resolves the art problems mentioned in the present state of the art. More specifically, the cap-pack assembly, object of this invention, is configured for being fitted together. The top part of the container is configured to receive what is the actual cap, which is crowned on one side of its domed crest by a slanted cylindrical neck and screw mouth and the lower distal mouth is placed on the longitudinal symmetry shaft of its cavity. The cap or hood also forms an air-tight, floodable and irregular chamber, which is originated where it joins the container, the place where the dosage is calibrated; and closure means represented by a screwed and sealed stopper, which closes the mouth of the cap.

This cap is basically characterised because its structures combine with the semi-spherical bulge that is logically in correspondence with a cavity. The bulge is located on one side of the top of the container and its height is the same or more than that of the proximal tube placed on the adjacent horizontal flat surface and which is divided in a transverse cut by the diagonal wall that has a cleft at the top and contains a depression in the entire upper perimeter of the container in which the edge of the cap cavity is fitted.

The bulge is therefore characterised for having three basic functions: (a) at the top it has a cleft which is the bed where the lower distal end of the neck of the mouth is fitted; (b) the outer diagonal wall of the bulge is consequence of its transverse cut and it acts lengthwise as outlet ramp of the measure from the chamber towards the outer mouth; and (c) the inner space of the transverse cut bulge acts as a dome or extra irregular cavity containing air when the pack is upright and idle, because this air prevents that cavity from being filled with liquid. This condition changes however when tilted to serve the measure, because the cavity becomes flooded when receiving part of the liquid contained in the pack, an event which reduces its level and a circumstance that is vital in the first measures, because it prevents the inner level of the container from reaching the edge or mouth of its vertical tube and altering the measure.

When the cap is working normally, it is fitted—after filling the container—to the perimeter of bottles or packs shaped to receive it and forming a single body. The recipients contain an upright tube on a side plane of their crest with border for entry and exit of the liquid and on the other side there is a semi-spherical bulge cut transversally with a cleft in which the distal end of the mouth of the cap is fitted; when both elements are joined, the inside forms an independent and air-tight chamber. The measure is selected by tilting the plugged container to flood the hermetic chamber. When the unit is placed upright again and the liquid becomes level, the surplus goes back into the pack via the upright tube, the edge of which establishes the size of the measure formed which remains isolated in the chamber until poured.

The container with the cap is now ready to measure its contents, the cap has a hollow and domed structure containing a neck on one side of its cover in the diagonal that screws on the mouth, that is closed with a common stopper, its lower perimeter cavity is fitted in place and adjusts to an air-tight container shaped to receive it. This container has previously been filled with liquid via an upright tube with open mouth placed on the flattened side of its crest; on the other upper side of the container there is a semi-spherical bulge cut transversally in the form of a ramp, that facilitates the pouring out of the measure and when the container is tilted, its hollow is filled with part of the liquid content, an effect that lowers the level of the stored liquid.

At present, in bottles or packs of household products whose contents need to be measured, this is done by filling a large independent cap which acts as measure. It is uncomfortable and insecure to handle and the user proceeds as follows: (i) holding the bottle in his/her right hand; (ii) he/she unscrews the cap and holds it in his/her left hand; (iii) he/she then tilts the bottle towards the cap and pours the liquid with acumen and care up to the indicated mark which determines the measure. Because this operation is done by hand, it is easy to pass or fall short of the measure. In addition, spills may occur cause by shaky hands or tilting too much; consequently the system used is insecure, uncomfortable and in no way hygienic; (iv) the cap with the measure stays in the user's left hand and must be emptied at destination with the risk of not doing it right every time; (v) once this is done, the cap is screwed down with remains of the liquid and the bottle is then deposited in its place.

With containers that have the elements of this dispensing system, object of the invention, the measure is obtained and served as follows: (i) pick up the closed container with the hood cap and tilt it. This has to be done in order to fill the dispensing chamber and then put it back in upright position again, at which moment the measure is selected inside it and—by levelling—; (ii) unscrew the cap and tilt the bottle to pour the measure directly, safely and hygienically in the respective place; and (iii) replace the stopper on the container and put back in its place.

Consequently, the main advantages of this invention can be summarised as follows:

It substitutes the present and unsafe procedure of dispensing liquids with the state of the art measuring cap, that is handled by hand and may be spilt, get dirty and splash its contents.

Since the measure is selected inside the container, the measure flows complete to its destination and with maximum hygienic guarantees.

The liquid is poured directly and without spills, tipping the container approximately 45 degrees with regard to the vertical.

The dispensing system generated by the container and cap permit the measure to be loaded by simply twisting or turning the device.

When there is no need to measure, the cap may directly serve all or part of the liquid contained in the recipient safely and directly, without spills or mishaps.

The hood cap, coordinated with the recipient or pack, selects the measure inside the chamber generated between both, doing this independently from the rest of the liquid until the user decides to serve it for consumption.

The container is filled at the factory, before adding the cap and at the speed established by the filling station.

It simplifies the task of selecting and continuously serving uniform measures of liquid until this is empty.

The cap, made in transparent material, permits the level reached by the measure to be seen and the filling and emptying of the portion.

The cap which is included in this invention contains a hollow and domed structure, that is crowned on one side of its cover with a neck and screw mouth. Its hollow base is fitted to the respective container around its upper perimeter to produce an air-tight chamber that retains a uniform and independent portion of the liquid which when extracted forms the measure. It is made in glass or plastic.

The container is made with blowing techniques and with a design and measurements coordinated with the cap, it has on one side of its flattened top a vertical tube with filler mouth and its predetermined length establishes the level of liquid that forms the size of the measure; on the other proximal upper side it contains a semi-spherical bulge, at the top of which there is a half shank shape cleft in which the lower distal end of the neck of the cap is fitted; in the upper zone of its volume, its perimeter is reduced, designed to receive the base of the cap to form a single unit, association or assembly that produces an air-tight chamber between the two components, and whose task is to select, retain and serve a calibrated portion of liquid that forms the measure. It is made in glass or plastic.

The chamber is the space that results from obtaining the union of the above two elements. The cap forms this chamber on five sides and its base is the diagonal wall of the bulge and the flat crest that contains the tube of the container; this chamber communicates directly with the container via the vertical tube that is permanently open and which floods it when the device is turned. Consequently the task of this chamber is to select and retain a calibrated portion of liquid in its interior until the user decides to consume it.

The stopper is a common screw-top stopper to close the cap mouth.

In all the preferential embodiments of the invention, before the container is fitted on the cap, it is filled with liquid in an automatic industrial process. After it is filled, the cap is assembled and fixed. This operation is made instead of the capping operation, because the cap includes a screw and seal stopper.

In all the preferential embodiments of the invention, the measure is separated from the rest of the fluid by tipping the plugged device. This manoeuvre guarantees maximum hygiene because the measure that is separate from the rest of the fluid remains isolated inside the chamber formed between both elements.

In all the preferential embodiments, the described dispensing means are adapted to all shapes of containers which include the bulge, the vertical filler tube which the invention proposes and the depression to assemble the cap and if the system is applied to cardboard packs, a platform is screwed on that pack which holds the upper elements of the container, so that a closed cap fits hermetically on that platform with the same stopper of the pack.

The cap is made by thermo-injection or other techniques and the bottle or associated container with glass or plastic blower techniques. In order to achieve the objectives and avoid the mentioned inconveniences arising from the present day measuring systems, this invention resolves the dispensing of fluids, by means of a container with vertical tube with side bulge and mouth, made to receive and fix—after filling—a shaped cap, which when both are joined, form a single unit inside which an independent chamber is originated, that is floodable and hermetic with exit to the exterior via the mouth of the cap and flooded with liquid from inside via the vertical tube of the associated container.

The two elements present coordinated shapes and sizes which fit with great precision obtaining watertightness to provide the user a regular, hygienic and continuous dispensing service until the entire fluid has been consumed.

In a preferential embodiment of the invention designed to contain detergents or liquid soap for household appliances, to pour the measure into the mouth of the washing machine, the neck of the container is fitted directly on this, is tilted approximately 45° and the entire portion comes out; the container is then plugged again to select the next measure.

In another preferential embodiment, a large part of the chamber is formed by a concavity foreseen in the upper cover of the container which, as in the other variants, receives a hermetic cap that closes its entire perimeter and contains an upper exit screw neck.

The basic stages of the form of use of the object of the invention are described below, and which includes the following stages:

Rotation or tilting of the plugged recipient to flood the air-tight chamber.

Place the container upright again, the liquid is levelled, the surplus returns to the container and the measure is thus formed.

Remove the stopper to serve the measure.

Pour the contents from the chamber by tilting the device approximately 45°. The complete measure will come out.

Screw on the stopper again to restart the loading cycle and be able to select the new measure and so on successively.

Throughout the description of the claims, the word «includes» and its variants does not intend to exclude other technical characteristics, additives, components or steps. For experts in the matter, other objects, advantages and characteristics of the invention will be deduced partly from the invention and partly from the practice of the invention. The following examples and drawings are provided by way of illustration and are not intended to restrict this invention. In addition, the invention covers all possible combinations of personal and preferential embodiments indicated here.

BRIEF DESCRIPTION OF THE DRAWINGS

A series of drawings are described very briefly below which help understand the invention better and which are specifically related with various embodiments of that invention, which are illustrated by way of example only and without limitation.

FIGS. 3, 4, 5 and 6 show an embodiment of the invention which presents a rectangular configuration.

FIGS. 7 and 8 show the invention in a cylindrical pack.

FIGS. 10 and 11 represent in graphic sequences the form of selecting the measure and pouring it.

FIG. 14 describes a preferential embodiment of the invention and FIG. 15 shows the invention coupled to containers with different aspects.

FIGS. 16 and 17 represent in elevations, plants and perspectives another preferential embodiment of the invention with illustrations that include the adopted numbering.

FIGS. 18 and 19 show the cap in elevations, plants, sections and perspectives of possible versions applied to known packs which, for their characteristics, may be used for chemical products.

FIG. 20, show a variant in the shape of the chamber (Hd), which is formed here by a cavity in the cover of the container.

EXPLANATION OF A DETAILED FORM OF EXECUTING THE INVENTION

Figure 1:
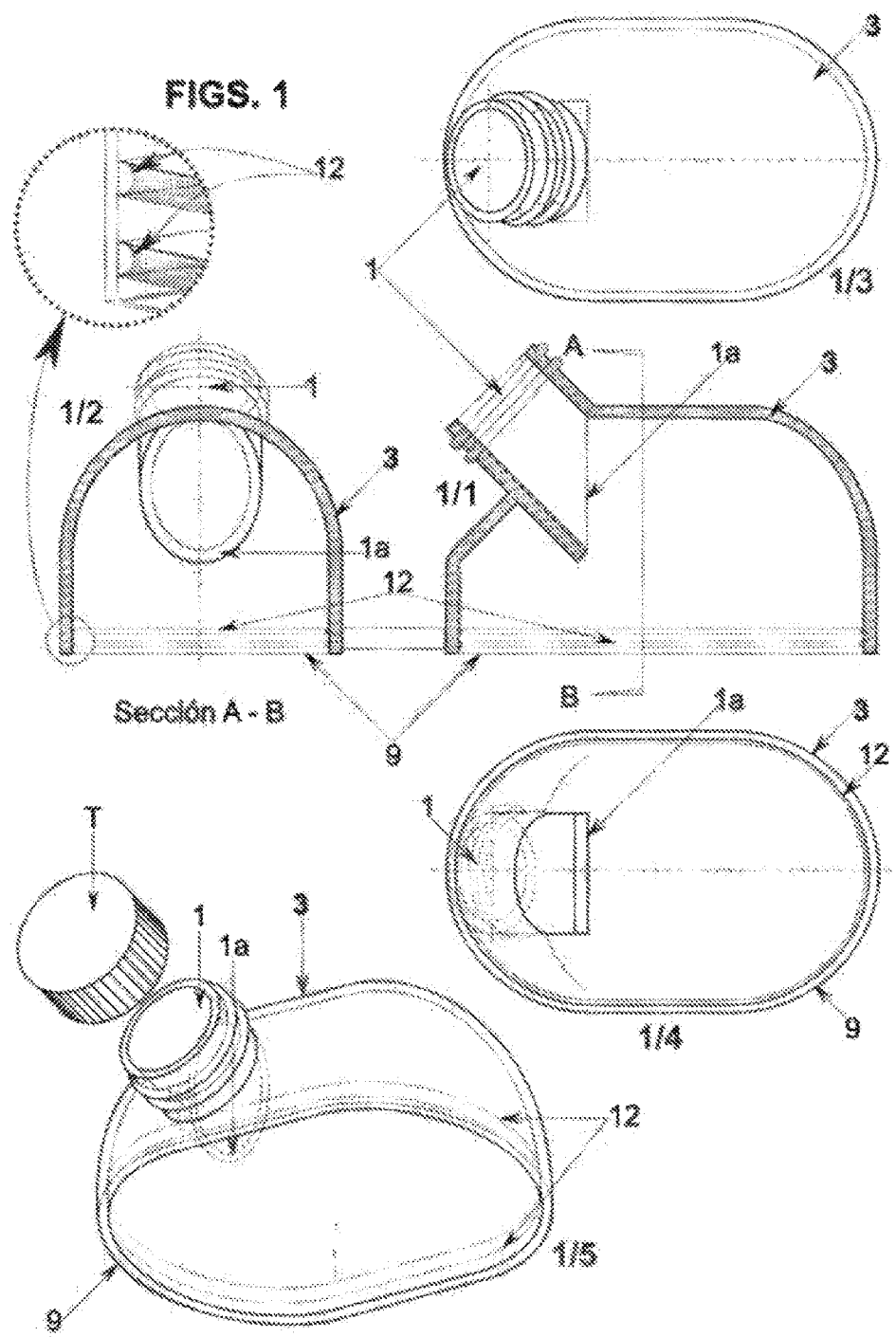
FIG. 1 shows the cap in elevations, plants, sections and perspective and an enlargement of the element that contributes to its watertightness in its assembly with a bonded container. All illustrations include the adopted numbering FIG. 2 describes the cap in perspective and below this, the bonded container that is made with the receiver characteristics to form a single piece with the said cap. Next to this, the aesthetic result of the union between both is represented.

In view of the mentioned Figures and in accordance with the numbering adopted, various examples of preferential embodiments of the invention can be observed in them, which include the parts and elements that are indicated in detail below. Thus, as is observed in FIGS. 1 to 20 various possible embodiments of the invention, which joined to bottles or containers that have previously been filled with liquid, enables them to separate uniform portions of the fluid and serve them as calibrated measure extracted from the general contents of the associated container quickly and hygienically. The container cap unit is handled as a bottle or common pack because both, when joined, form a single unit that basically includes the elements that are described below, with reference to the indicated Figures.

The invention basically consists of:

A container (6) on which the cap (3) is fitted airtight, that presents a semi-spherical bulge (2) on its upper side, that is cut and irregular and inside which a cavity (Oi) is produced that increases its capacity and with a half shank (Mc) shaped cleft at the top designed to hold the lower distal end of the neck (1a) of the cap (3); on the other side of its flat, preferentially horizontal crest, it contains a tube (1c) of predetermined length, the edge (4) of which acts as receiver mouth of the container's industrial filling, also as supply mouth to flood the chamber (Hd) to the container (6), an evacuation which by levelling calibrates the measure (Ds).

A domed cap (3) closed in its upper zone, on one side of which its crest presents a tilted diagonal neck with screw outlet mouth (1) for the stopper (T); that neck has a concentric prolongation, cut vertically (1a) which hangs inside the roof of the dome of the cap (3); the inner perimeter of the base space (9) contains edges or half shanks (Mc) that fit the upper perimeter of the pack (6) to achieve the watertightness of the chamber (Hd), which is a core element in the dispensing system where the measure (Ds) is selected and dimensioned by levelling.

The so-called bulge (2), with its irregular semi-spherical structure, has three functions: (i) the diagonal wall (Pd) facilitates the exit of the liquid via the mouth (1); (ii) the cavity (Oi) when the device is tilted, fills with liquid and the level of the liquid inside the container (6) goes down; (iii) the cleft (Mc) houses the distal end (1a) of the neck.

A common screw stopper (T) or some other technique that closes the mouth (1).

Thus, as is observed in FIGS. 1 to 20, in this preferential embodiment, there are various possible embodiments of the invention which enables the packs to separate uniform portions of the fluid which serve as calibrated measure (Ds) extracted from the contents of the associated container quickly and hygienically. The cap-container device is handled like a normal pack or bottle because since both parts are joined, they form a single body or pack.

In a preferential embodiment, as can be observed in FIG. 1, the cap (3) consists of a single part, whose elements, mouth (1) and neck, form part of its structure and the borders (12) which in the shape of a half-shank, cover the inside of the whole of the lower perimeter of the cap (3) to guarantee its watertightness with the associated container (6).

FIGS. 1/1, 1/2, 1/3 and 1/4 provide details in section and plant of the forms and elements of the cap (3) where the mouth and its proximal cylindrical neck are marked as (1); (1a) is the distal end of the vertically cut neck designed to be fitted in a cleft (Mc) of the container (6); the reference (12) indicates the borders that are parallel and proximal to the edge (9) with half-shank section—detailed in an enlargement in FIG. 1/2—which ensure the tightness of the unit formed by both elements, the cap (3) and the container (6).

Figure 2:
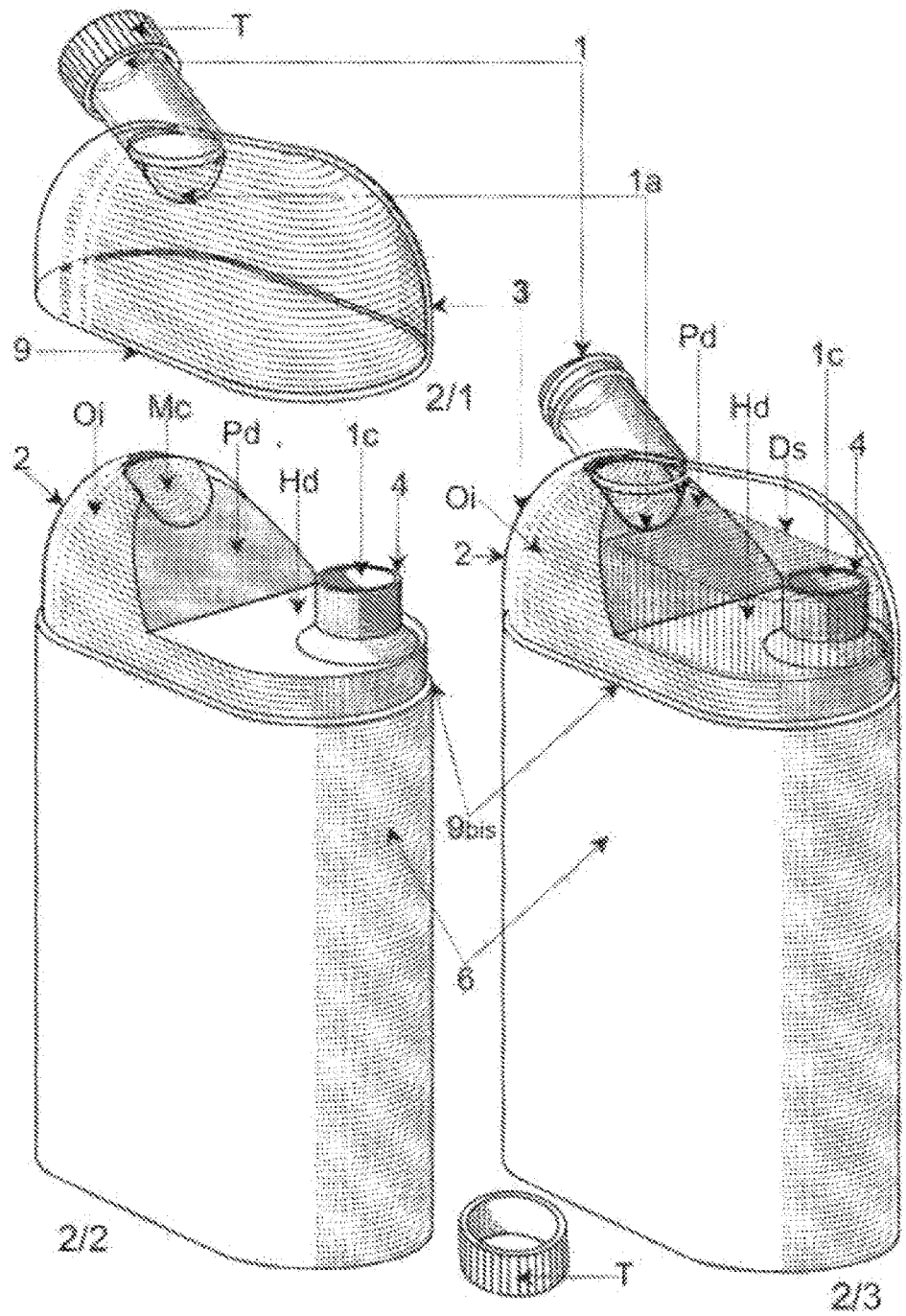

FIG. 2/1 shows a perspective of the cap (3) and FIG. 2/2 describes the container (6) in perspective where its characteristics and elements can be seen, formed by a single cavity structure which presents a reduction in its perimeter (9bis) to receive the edge (9) of the cap and form a single body, where reference (2) indicates the upper side bulge the top of which contains the cleft (Mc) and under this inner cavity (Oi) which helps reduce the level of liquid of the container (6). Reference (1c) indicates the vertical tube located on the other flat side of the container (6) the border (4) of which can be reached by the liquid in the chamber (Hd) because all the liquid which exceeds this is absorbed by the tube (1c) and returned to the container (6).

FIG. 2/3 describes the result of the ideal union between both elements (3) and (6) clearly showing the chamber (Hd) that has been produced between them and which gives them the power to measure.

FIG. 3/1 shows a section of the cap (3) where with (12) the half shank borders are shown that obtain the watertightness between the two components; FIG. 3/2 is a section of the container (6) where (Mc) is a cleft in the form of a half shank designed to hold the lower distal end (1a) of the neck.

FIG. 3/2 shows the section of the recipient (6) with the bulge (2) where the tube (1c) can be seen, its edge (4); between that bulge (2) and the vertical tube (1c) forms the chamber (Hd); reference (9bis) shows the perimeter undercut of the container (6) which receives the edge (9) of the cap (3); (2) shows the cut side bulge of the container (6) which contains the cleft (Mc) of its top to receive the lower distal end (1a) of the cap (3). In this same preferential embodiment FIG. 3/3 describes in section the two assembled parts of the invention where the measure (Ds) is represented. FIG. 4 shows a section of the unit. FIG. 5/1 and FIG. 5/2 show the breakdown in perspective with the adopted numbering. FIG. 6 shows in perspective both assembled elements.

In another preferential embodiment shown in FIGS. 7 and 8 the invention is described in a compact cylindrical format designed for household cleaning products. FIG. 7/1 shows the section of the invention with its components assembled; the cylindrical container (6) crowned with the domed cap (3). In other words, both forming a single body that originates an airtight chamber (Hd) between them which can select and serve uniform portions of liquid contained in the recipient (6). FIGS. 7/2 and 7/3 show a variant of the unit in section, which present the vertical tube (1c) better modelled, modelled vertically to adapt to the unit in section. FIGS. 7/2 and 7/3 show a variant on the above which includes a second mouth (1b) on the side of the dome of the cap that is used to fill the container (6) with the cap (3) assembled. After filling, this mouth (1b) may remain closed with a common stopper (T) or be decommissioned by means of a thermal clamping or some other technique.

FIGS. 8/1, 8/2 and 8/3 show in perspective the outside appearance offered by the above three containers. In FIG. 8/1 the container (6) can be seen before being joined to the cap (3) observing the cleft (Mc) ready to receive the distal end (1a). The chamber (Hd) can be seen that remains hermetic when the cap (3) is added where the circular limit flange that receives that cap (3) is indicated with (PS). The vertical tube (1c) and its edge (4) can be seen in this figure. In FIGS. 8/2 and 8/3 the difference between both models for the addition in 8/3 of the mouth (1b) is described.

Figures 9, 10:
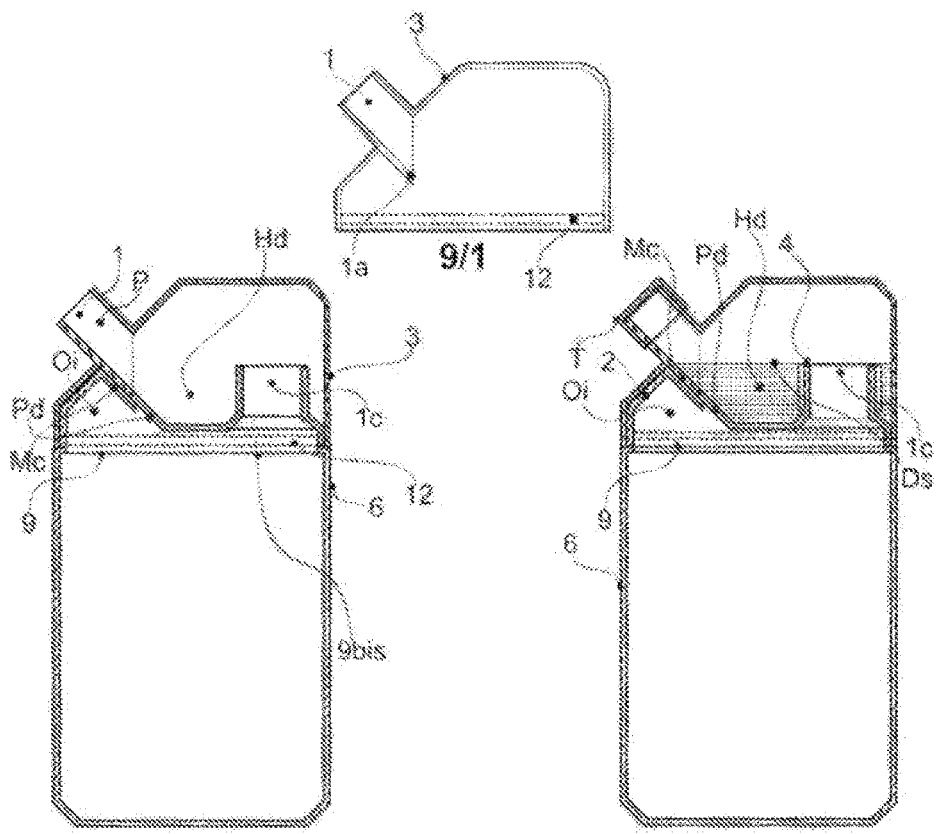
FIGS. 9 to 13 show different characteristics of the invention.
Figure 11:
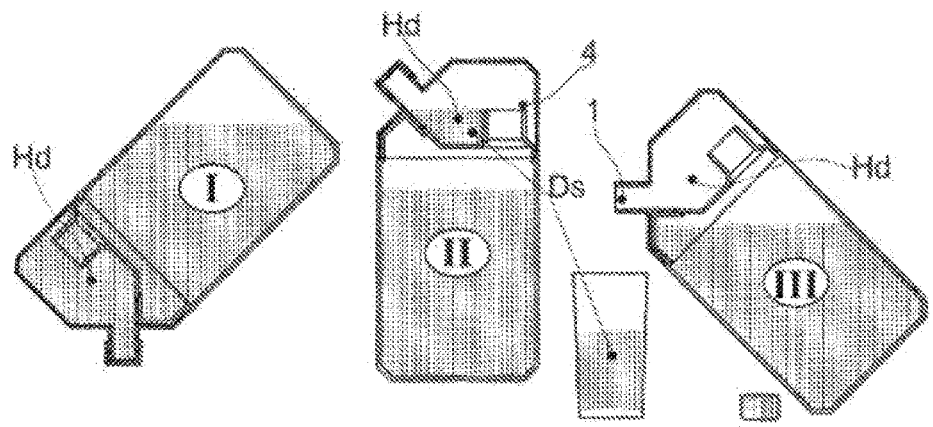
Figure 12:
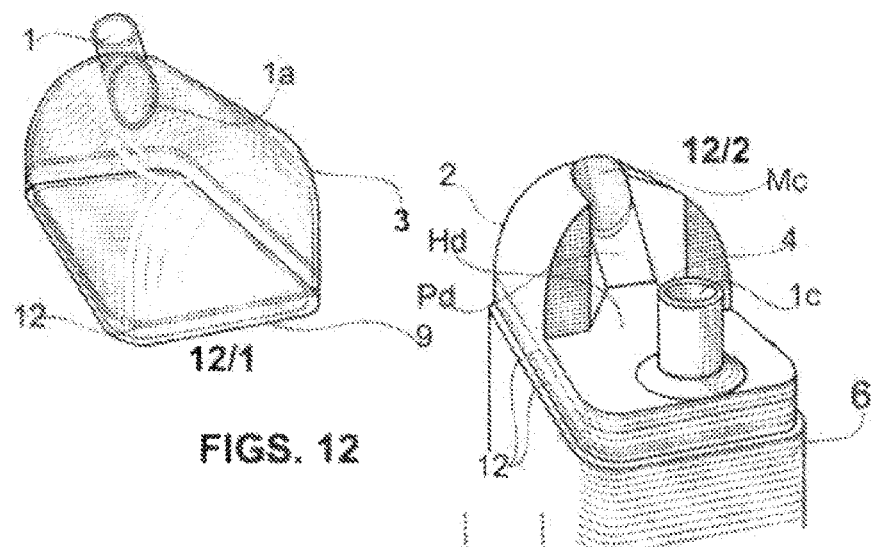

FIG. 9 shows a container and cap assembled with the mouth (1) open. FIG. 9/1 details in section another preferential embodiment of the cap (3) in which the mouth (1) can be seen and its sectioned distal end (1a) and FIG. 10 shows the sections of a container (6) and cap (3) with the mouth (1) plugged, where the measure (Ds) is referenced. FIG. 11 show, marked with Roman numerals, the sequences of the operating mode of the invention. In (I) the filling position of the chamber (Hd) is observed. In (II), moment when the measure is selected when placing the device upright with the stopper screwed tight, levelling the liquid on the edge (4) and with the surplus liquid going out from this same place (4). (III) describes the moment when the chamber (Hd) is left empty after serving the measure. All illustrations show the adopted numbering.

Figure 13:
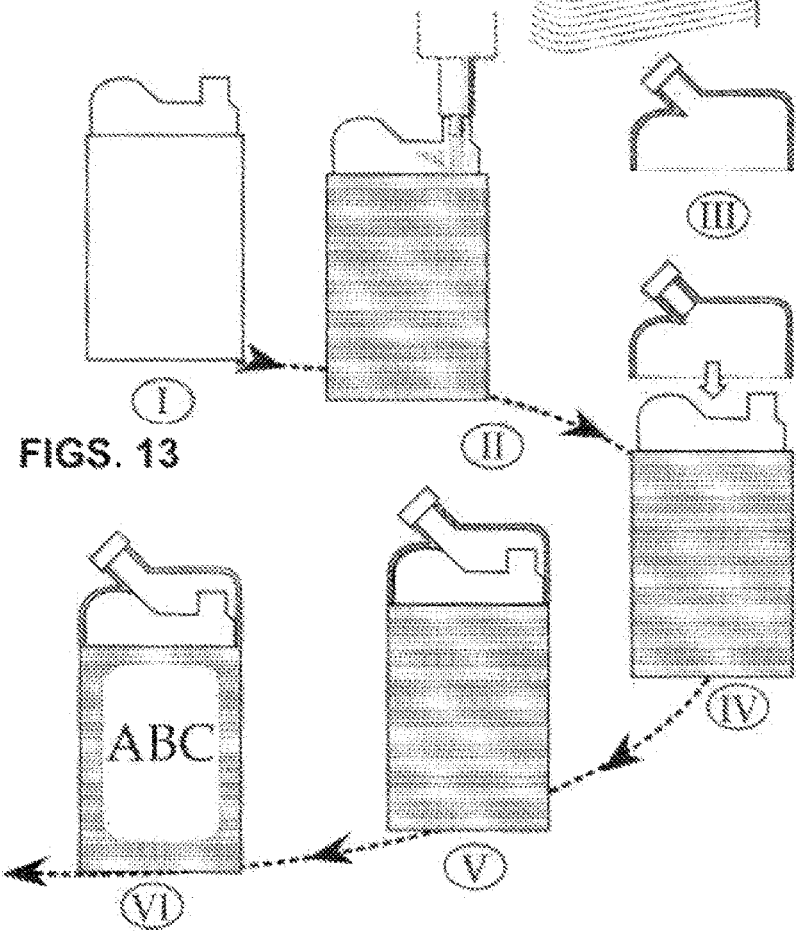

FIG. 13 shows the cycles of the industrial filling process of the container: I, corresponds to the empty container in its route to the industrial filling mouth marked II; Ill indicates the cap (3) supply station which includes the sealed stopper (T); IV indicates the moment when the cap (3) is assembled on the container (6), which advances, —marked with a V, towards the labelling section VI.

In another preferential embodiment shown in FIG. 14 two embodiments of the invention are seen; 14/1 shows the cap (3) and container (6) unit with round shapes, whereas in 14/2 the shapes of the container (6) are angular. FIG. 15 shows preferential embodiments of the invention which, in this case, adopts rounded shapes. FIG. 15/1 describes the invention in a breakdown with oval section and FIG. 15/2 shows the invention with its components (3) and (6) assembled. FIG. 15/3 shows a breakdown of another embodiment.

In another preferential embodiment shown in FIG. 16, including FIGS. 16/1, 16/2, 16/3, 16/4 and 16/5 elevations of the cap (3) with rounded shapes are shown. FIG. 16/6 represents a screw stopper (T). FIGS. 16/7 and 16/8 show a version of the container (6) which presents oval shaped bulges (14) on the sides which—when pressed—facilitate the exit of the liquid to the upper part of that container (6). FIG. 17/1 shows a perspective of the cap (3) and FIG. 17/2 describes the container (6). FIG. 17/3 shows the product assembled and the oval shaped bulges (14) can be clearly seen.

In another preferential embodiment of the invention shown in FIGS. 18, 18/1, 18/2, 18/3, 18/4 and 18/5 the invention is described adapted to a rectangular cardboard container (6) for liquids, where a platform is coupled screwed on the mouth of that pack which is equipped with the bulge (2) on one side and in front of this the tube (1c) screwed inside and concentric to the mouth of the pack (6); the cap (3) is then inserted by pressure which, when creating the cavity (Hd) allows this pack to measure. FIGS. 19/1, 19/2, 19/3, 19/4, 19/5 and 19/6 show in plant, section and perspective the components of this application; FIG. 19/7 shows a perspective view of the standard pack equipped with the elements of the invention that enable it to measure its liquid contents. The drawings contain the numbering that has been adopted.

In another preferential embodiment of the invention, FIG. 20, show a smaller size cap (3) to save material, without reducing the capacity of the chamber (Hd), because in this case, a large part of this is formed by a cavity on the cover of the pack (6). A section view of this cavity is shown in FIGS. 20/2, 20/3 and 20/4. FIGS. 20/6 and 20/7 show a perspective view, for a better understanding, of the invention with rounded shapes. All illustrations contain the adopted numbering.

The invention claimed is:

1. A liquid dispenser for dispensing a predetermined quantity of liquid comprising:
   a cap (3) having a concave shape and including a concave interior (Oi) between a domed crest and a lower perimeter border (9), wherein said domed crest includes, on its side, a slanted cylindrical neck, wherein said slanted neck further having a mouth (1) and a lower distal end (la), wherein said slanted neck is prolonged at said lower distal end (la) towards said concave interior, and wherein said mouth is configured to be closed by means of a stopper (T); and
   a container (6) that includes a semi-spherical bulge (2), a diagonal wall (Pd), and a proximal upright tube (1c) situated on a horizontal flat surface, said horizontal flat surface is adjacent and connected to said diagonal wall, wherein said container (6) having a depression (9bis) around the whole of its upper perimeter for receiving said lower perimeter border (9) of said cap (3), thus providing a watertight chamber (Hd) between the assembled cap (3) and the container (6), wherein said semi-spherical bulge protrudes within a portion of said concave interior (Oi), wherein said semi-spherical bulge further having a cleft (Mc) configured to fit with said slanted cylindrical neck of said cap, wherein said diagonal wall (Pd) transversely intersects with said semi-spherical bulge, wherein said semi-spherical bulge having a height equal to or more than that of said proximal upright tube (1c), thus forming a floodable selected measure (Ds).

2. The liquid dispenser of claim 1, wherein said chamber (Hd) is formed on its sides by the walls of the cap (3), whereas its base corresponds to the diagonal wall (Pd) and said horizontal flat surface.

3. The liquid dispenser of claim 1, wherein said diagonal wall (Pd) is shaped to receive and hold said lower distal end (1a) of said slanted neck.

* * * * *